United States Patent
Otto et al.

(10) Patent No.: US 12,042,960 B2
(45) Date of Patent: **\*Jul. 23, 2024**

(54) LOUDSPEAKER MEMBRANE WITH SPRAY-COATED ELASTOMER LAYER

(71) Applicant: SSI New Material (Zhenjiang) Co., Ltd., Zhenjiang (CN)

(72) Inventors: Gustav Otto, Vienna (AT); Peter Thurner, Tribuswinkel (AT); Christian Lembacher, Gramatneusiedl (AT)

(73) Assignee: SSI New Material (Zhenjiang) Co., Ltd., Zhenjiang (CN)

( * ) Notice: Subject to any disclaimer, the term of this patent is extended or adjusted under 35 U.S.C. 154(b) by 1027 days.

This patent is subject to a terminal disclaimer.

(21) Appl. No.: 16/921,620

(22) Filed: Jul. 6, 2020

(65) Prior Publication Data

US 2020/0331174 A1 Oct. 22, 2020

Related U.S. Application Data

(63) Continuation of application No. 15/281,505, filed on Sep. 30, 2016, now Pat. No. 10,710,282.

(Continued)

(51) Int. Cl.
*B29C 41/00* (2006.01)
*B29C 41/02* (2006.01)
(Continued)

(52) U.S. Cl.
CPC ............ *B29C 41/003* (2013.01); *B29C 41/02* (2013.01); *B29C 41/365* (2013.01); *B29C 65/56* (2013.01);
(Continued)

(58) Field of Classification Search
CPC ..... B29C 41/003; B29C 41/02; B29C 41/365; B29C 65/56; B29C 41/08; H04R 7/04;
(Continued)

(56) References Cited

U.S. PATENT DOCUMENTS 4,989,497 A * 2/1991 Lerma ................... B29C 70/342
92/103 SD
5,356,941 A 10/1994 Sullivan et al.
(Continued)

FOREIGN PATENT DOCUMENTS

CN 101318166 A 12/2008
CN 102474684 A 5/2012
(Continued)

OTHER PUBLICATIONS

Second Office Action dated Nov. 12, 2018 for counterpart Chinese patent application No. 201610203146.5.
(Continued)

*Primary Examiner* — Oyesola C Ojo
(74) *Attorney, Agent, or Firm* — Dykema Gossett PLLC

(57) ABSTRACT

A membrane for an electro-acoustic transducer comprised of at least one elastomer layer made using spray coating of a liquid elastomer solution is provided. The at least one layer of elastomer is made by spraying a liquid elastomer solution, which may comprise a silicone, onto a mold having the desired membrane geometry, allowing the solution to cure and remove the membrane from the mold. The mold can be configured to hold other components of an electro-acoustic transducer that will be attached to the membrane after the curing step.

11 Claims, 6 Drawing Sheets

Related U.S. Application Data

(60) Provisional application No. 62/311,925, filed on Mar. 23, 2016, provisional application No. 62/235,943, filed on Oct. 1, 2015.

(51) Int. Cl.

| | | |
|---|---|---|
| *B29C 41/36* | (2006.01) | |
| *B29C 65/56* | (2006.01) | |
| *B29K 21/00* | (2006.01) | |
| *B29K 83/00* | (2006.01) | |
| *B29L 31/34* | (2006.01) | |
| *H04R 7/04* | (2006.01) | |
| *H04R 9/06* | (2006.01) | |

(52) U.S. Cl.
CPC .......... *H04R 7/04* (2013.01); *B29K 2021/003* (2013.01); *B29K 2083/00* (2013.01); *B29K 2995/0001* (2013.01); *B29L 2031/3418* (2013.01); *H04R 9/06* (2013.01)

(58) Field of Classification Search
CPC ...... H04R 9/06; H04R 7/06; B29K 2021/003; B29K 2083/00; B29K 2995/0001; B29L 2031/3418
See application file for complete search history.

(56) References Cited

U.S. PATENT DOCUMENTS

| | | | | | |
|---|---|---|---|---|---|
| 5,549,924 | A | * | 8/1996 | Shlenker | A61F 6/04 427/407.1 |
| 5,587,562 | A | * | 12/1996 | Sato | H04R 7/00 525/437 |
| 7,211,173 | B1 | | 5/2007 | Staerzl et al. | |
| 8,284,964 | B2 | * | 10/2012 | Windischberger | H04R 7/10 381/174 |
| 2003/0111167 | A1 | * | 6/2003 | Raphel | B29C 41/02 156/230 |
| 2004/0112672 | A1 | * | 6/2004 | Ono | H04R 31/003 181/170 |
| 2006/0264756 | A1 | * | 11/2006 | Lo | G01N 29/28 600/459 |
| 2007/0016053 | A1 | * | 1/2007 | Lo | A61B 5/411 600/459 |
| 2007/0269698 | A1 | * | 11/2007 | Gu | H01M 4/8828 429/492 |
| 2010/0159148 | A1 | * | 6/2010 | Hagens | C09D 7/65 427/427.4 |
| 2011/0026757 | A1 | * | 2/2011 | Takahashi | H04R 7/125 381/397 |
| 2012/0093353 | A1 | | 4/2012 | Windischberger et al. | |
| 2015/0181350 | A1 | * | 6/2015 | Poupyrev | H04R 19/013 381/190 |
| 2015/0312660 | A1 | * | 10/2015 | Lembacher | H04R 7/10 381/396 |
| 2016/0287380 | A1 | * | 10/2016 | Shi | A61F 9/0017 |

FOREIGN PATENT DOCUMENTS

| | | |
|---|---|---|
| CN | 205647939 U | 10/2016 |
| JP | H0267100 A | 3/1990 |
| WO | 2009010838 A2 | 1/2009 |

OTHER PUBLICATIONS

Search Report dated Nov. 12, 2018 for counterpart Chinese patent application No. 201610203146.5.
Painting Skills Training, Sep. 30, 2004, China Machine Press (ISBN 7-111-04895-4), pp. 285-286.
Furniture Surface Finishing, May 31, 2006, Northeast Forestry University Press (ISBN 7-81076-872-7), pp. 174-176.
Pham, N.P., et al., "Spin, Spray coating and Electrodeposition of photoresist for MEMS structures a comparison", Eurosensors, pp. 81-86 (2002).
Pham, N.P. et al., "Photoresist Coating Methods for the Integration of Novel 3-D RF Microstructures", J. of Microelectromechanical Systems, 13(3), pp. 491-499 (2004).
Choonee,, K., et., "Post Processing of Microstructures of PDMS Spray Deposition", Sensors and Actuators A: Physical 155.2, pp. 253-262 (2009).
First Office Action and search report dated May 10, 2018 for counterpart Chinese Patent Application No. 201610203146.5.

* cited by examiner

LOUDSPEAKER MEMBRANE WITH SPRAY-COATED ELASTOMER LAYER

PRIORITY

This patent application is a continuation of U.S. patent application Ser. No. 15/281,505, filed on Sep. 30, 2016, which claims priority to U.S. Provisional Pat. Appl. No. 62/235,943, filed on Oct. 1, 2015, and U.S. Provisional Pat. Appl. No. 62/311,925, filed on Mar. 23, 2016, the disclosures of each of which are incorporated herein, in their entirety, by reference.

BACKGROUND OF THE INVENTION a. Field of the Invention

The present invention relates, in general, to methods for manufacturing membranes for electro-acoustic transducers and membranes made by the disclosed methods, more particularly, to a method of manufacturing a membrane for an electro-acoustic transducer such as a micro speaker, miniature microphone or receiver, for use in mobile communication devices, the membrane made from an elastomer using spray coating.

b. Background Art

It is desirable for electro-acoustic transducers used in microelectronics to be as compact as possible. However, especially in the case of speakers, it is also desirable that the speaker should be able to output in the broadest range of frequencies possible.

A speaker comprises a membrane attached to a voice coil, which is positioned within a magnetic field defined by a permanent magnet and yoke arrangement. The performance of the speaker is dependent on the resonant frequency. Above the resonant frequency, the output response is relatively flat. Therefore, a low resonant frequency gives rise to a wideband performance. The resonant frequency is a function of the stiffness and the mass of the moving parts. The stiffness is dependent on two factors: the stiffness of the membrane and the stiffness of the back volume.

The membrane in conventional micro speakers comprises a thermoplastic foil formed by deep drawing or stamping. The foil has a relatively high stiffness and, conversely, a relatively low compliance. Without additional measures, such a membrane will cause a relatively high resonant frequency in a conventional micro speaker.

Recent improvements in membrane technology has seen membranes comprised of an elastomer having stiffness significantly less than conventional thermoplastic foils. For example, one such improvement is detailed in U.S. patent application Ser. No. 13/380,428, filed Jun. 23, 2010 (PCT date), and published as U.S. Pat. Publ. No. 2012/0093353 A1 on Apr. 19, 2012. (The entire disclosure of such application is herein incorporated by reference.) The disclosed membrane is comprised of an elastomer, including silicone, and is made using injection molding.

While using injection molding to form elastomer membranes has many advantages over the use of deep drawing or stamping thermoplastic foil, it is not without its drawbacks. In particular, injection molding requires a two-part mold which adds to the complexity of the process and limits many aspects of the design, such as the minimum thickness obtainable for the membrane. The two-part mold also may not always be perfectly aligned, creating non-uniformity among multiple parts being produced. And even when near-perfect alignment can be achieved with new molds, during use, the mold pieces are susceptible to wear, which can cause alignment problems later.

Conventional membranes of thermoplastic foils are often constructed of multiple layers of different materials. The different layers of a multi-layer membrane can have different mechanical properties, allowing for adjustments for stability, damping or other performance characteristic. Examples of multi-layer membranes and the particular benefits of such are described in U.S. Pat. No. 8,284,964 and U.S. patent Ser. No. 14/699,548, filed on Apr. 19, 2015, published as Pat. Publ. No. 2015/0312660 A1 on Oct. 29, 2015, the disclosures of each of which are herein incorporated by reference in their entirety. However, multi-layer membranes comprised of an elastomer are not possible using injection molding. Further, while injection molding typically provides less variations in the thickness of a finished membrane than the deep drawn or stamping process, there is still a desire to improve the uniformity of the thickness of the membrane in order to lesson or eliminate tumbling of the membrane caused by asymmetries.

There is thus the need therefore to improve the process of manufacturing a membrane comprised of an elastomer for use with an electro-acoustic transducer.

SUMMARY OF THE INVENTION

In order to address the issues above, there is provided, in one embodiment of the invention, a method of manufacturing a membrane for an electro-acoustic transducer, the method including the steps of depositing one or more layers of a liquid elastomer solution on a mold having the desired membrane geometry, allowing the liquid elastomer to cure and removing the cured elastomer in the shape of the membrane off the mold. In an embodiment, the elastomer is a silicone. In other embodiments, the elastomer is a thermoplastic elastomer other than silicone. In one embodiment, the step of depositing a liquid elastomer on the mold comprises spray-coating using an ultrasonic spray nozzle. In another aspect of the invention, the spray-coating is achieved using forced air, without the use of an ultrasonic spray nozzle.

In one aspect, the liquid elastomer solution includes a liquid elastomer and a solvent. The depositing and curing steps comprise the deposition of multiple thin layers on the mold, allowing each layer to solidify by evaporation of the solvent, and thus curing of the liquid elastomer, before the next thin layer is deposited.

In another embodiment, the mold is heated to a predetermined temperature prior to the deposition step, allowing for the liquid elastomer to solidify almost immediately after deposition.

In further embodiments, the mold may be configured with recesses or other cavities to accept a frame, a voice coil, a stiffening plate, a wire loop or other parts that may be adhered to a membrane by adhesives in a conventional electroacoustic transducer. Prior to the depositing step, the frame, voice coil, stiffening plate, wire loop and/or other part is placed into the cavity or recess in the mold, such that a surface of the part will be in contact with the liquid elastomer solution during the deposition step. When the cured elastomer membrane is removed from the mold, the frame, voice coil, stiffening plate, wire loop and/or other part will be affixed to the membrane. In addition, a masking layer may be applied to one or more areas of the mold and/or one or more areas of the transducer part prior to depositing the one or more layers of a liquid elastomer solution in order to prevent those areas from being coated with the liquid elastomer solution.

In another embodiment, a method of manufacturing a membrane for an electro-acoustic transducer is provided, the method including the steps of depositing one or more layers of a liquid elastomer solution on a mold having the desired membrane geometry, allowing the liquid elastomer to cure, placing a stiffening plate on the cured liquid elastomer, depositing one or more additional layers of a liquid elastomer solution on the mold and stiffening plate, allowing the additional liquid elastomer to cure and removing the cured elastomer in the shape of the membrane with stiffening plate off the mold.

In another embodiment, the depositing step comprises depositing more than one thin layer of liquid elastomer solution on the mold, where one or more of the layers on the mold are of a different liquid elastomer solution having different mechanical (such as damping) and electrical properties when cured. In a further embodiment, the process further comprises depositing one or more layers of a non-elastomer thermoplastic solution on the mold, before, after or in between the deposition of the one or more layers of liquid elastomer solution.

There is also provided by the invention a membrane for an electroacoustic transducer, such as a mini speaker, a miniature microphone or a receiver, made by a process described in any of the embodiments above.

Specifically, in one embodiment, there is provided a membrane for an electroacoustic transducer comprising one or more spray-coated layers of an elastomer. In an embodiment, the multiple layers are of different elastomer materials having different mechanical properties. In other embodiments, the multiple layers are of the same elastomer.

In further embodiments, a membrane is provided comprising one or more spray-coated layers of an elastomer and one or more spray-coated layers of a non-elastomer thermoplastic.

In one embodiment, a membrane for an electroacoustic transducer is comprised of one or more spray-coated layers of a cured liquid elastomer, and is affixed to one or more parts of an electroacoustic transducer by curing a spray-coated layer of liquid elastomer, without the use of an additional adhesive. In another embodiment, the electroacoustic transducer part is a voice coil, a frame, a stiffening plate and/or a wire loop.

In an embodiment, a membrane for an electroacoustic transducer is provided, comprising one or more spray-coated layers of an elastomer, the membrane having a thickness of less than 100 μm. In another embodiment, the membrane has a thickness of less than 80 μm. In still another embodiment, the membrane has a thickness of less than 60 μm.

The foregoing and other aspects, features, details, utilities, and advantages of the present invention will be apparent from reading the following description and claims, and from reviewing the accompanying drawings.

BRIEF DESCRIPTION OF THE DRAWINGS

Further embodiments of the invention are indicated in the figures and in the dependent claims. The invention will now be explained in detail by the drawings. In the drawings:

DETAILED DESCRIPTION OF EMBODIMENTS

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Figure 1:
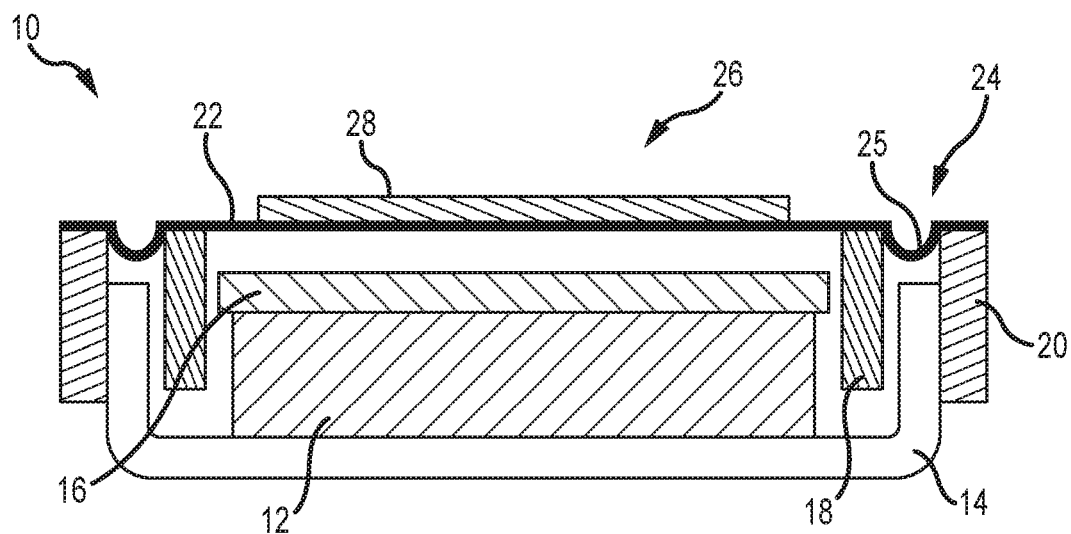
FIG. 1 shows the principle mechanical set-up of an electro-acoustic speaker with a membrane according to an embodiment of the invention.

FIG. 1 shows a cross-sectional view of a micro speaker used in mobile communication devices. Micro speaker 10 comprises a permanent magnet 12 disposed within a pot 14. A top plate 16 is disposed on the permanent magnet 12 and, along with the pot 14, focuses the magnetic field of the permanent magnet 12 into the a space between the permanent magnet 12 and the pot 14. A voice coil 18 is positioned around the permanent magnet 12, in the space between the permanent magnet 12 and the pot 14. A frame 20 surrounds the pot 14. A membrane 22 is attached to the frame 20 in an outer area 24 of the membrane 22, and is attached to the voice coil 18 in an inner area 26 of the membrane 22. The outer area 24 includes a dome-shaped area, or torus, 25 that facilitates piston-type movement of the inner area 26 of membrane 22. While torus 25 is shown as concave to the top surface of membrane 22, in other embodiments the it is convex to the surface of the membrane 22. A stiffening plate 28 is affixed to the inner area 26 of the membrane 22. In operation, an audio signal is fed into the coil 18 causing the coil 18 to oscillate within the magnetic field of the permanent magnet 12 and leading to a sound pressure P produced by the movement of the membrane 22.

The present invention is directed to a membrane for use in electro-acoustic transducers such as micro speaker 10, and a method of manufacturing such a membrane. It should be understood that the invention is not limited to micro speakers of the design depicted in FIG. 1, nor limited to micro speakers in general. For example, the shape of a membrane according to the present invention may be rectangular, as depicted, or circular, oval, etc. The pot 14 can further function as a carrier for micro speaker 10 and the magnet system can be comprised one or more permanent magnets, both on the inside and on the outside of the coil 18. The coil 18 itself may be attached directly to the membrane 22, as shown, to a bobbin which is attached to the membrane 22 or directly attached to a stiffening plate 28 affixed to the underside of the membrane 22. Further, while membrane 22 is shown having a concave torus 25 in outer area 24, a flat inner area 26 and with a flat stiffening plate 28, the topography of a membrane according to the present invention is not so limited. For example, membrane 22 could have a convex torus 25 or the stiffening plate 28 could have a dome. Additionally, a membrane made by the inventive process could be used in other electro-acoustic devices, such as microphones and receivers.

As noted above, it is the inventors intent to provide a method of manufacturing a membrane comprised of an elastomer that addresses the limitations of the injection molding process and that produces a membrane comprised of an elastomer having improved mechanical properties, increased uniformity of thickness and the ability to be fixed to other speaker parts without the use of an additional adhesive.

The process of manufacturing a membrane comprising an elastomer takes advantage of the recent advancements made in photoresist coating technology in the semi-conductor industry. Specifically, spray coating and electrochemical deposition ("ED") technologies have made significant progress in being able to obtain conformal coatings in the semi-conductor industry. The improvements over older spin coating techniques are substantial, as detailed in the documents N. P. Pham, et al., *Spin, spray coating and electrodeposition of photoresist for MEMS structures—A comparison*, Eurosensors, pp. 81-86 (2002) and N. P. Pham, et al., *Photoresist Coating Methods for the Integration of Novel 3-D RF Microstructures*, J. of Microelectromechanical Systems, 13(3), pp. 491-499 (2004). A summary comparison of the three coating types is provided in Table 1 of the second document, reproduced in Table 1 below.

TABLE 1

Characteristics of Photoresist Coating Techniques, N. P. Pham, et al., J. of Microelectromechanical Systems, 13(3), at p. 496.

| | Spin coating | Spray coating | ED coating |
|---|---|---|---|
| Process | Simple Difficult to automate trench coating process | Simple Batch fabrication | More complex Batch fabrication |
| Surface materials | Insulating or conductive | Insulating or conductive | Conductive Electrical contact to wafer |
| Photoresist | Several commercially available types High photoresist consumption | Photoresist solutions with viscosity < 20 cSt Very low photoresist consumption | Special ED resists Frequent refreshing of photoresist bath Moderate photoresist consumption |
| Resist uniformity | Difficult to control Poor reproducibility Dependent on shape, size and position of cavities on the wafer | Controllable Reproducible Independent on shape and position of the cavities | Controllable Reproducible and good uniformity Independent on shape, size and position of cavities |
| Parameters | Viscosity Spin speed | Solid content of solution Resist dispensed volume Scanning speed Spray pressure | Voltage Temperature Bath condition |
| Suitable applications | Transfer patterns to the bottom of etched cavities. One level etched and large cavities are preferable | Transfer patterns to the bottom of etched cavities. Cavities with comparable size are preferable | Transfer patterns that run in and across cavities. Metal patterning is preferable Coating over vertical walls are possible |

The preferred spray coating system includes an ultrasonic spray nozzle which generates a distribution of droplets of micrometer size. The aerosols are blown to the substrate and form a film which solidifies immediately or after a curing process. In another suitable spray coating system, the formation of droplets is done by forced air without the use of ultrasonic spray nozzles, as identified in Choonee, K., R. R. A. Syms, M. M. Ahmad, and H. Zou. "Post Processing of Microstructures by PDMS Spray Deposition." *Sensors and Actuators A: Physical* 155.2 (2009): 253-62.

Figure 2:
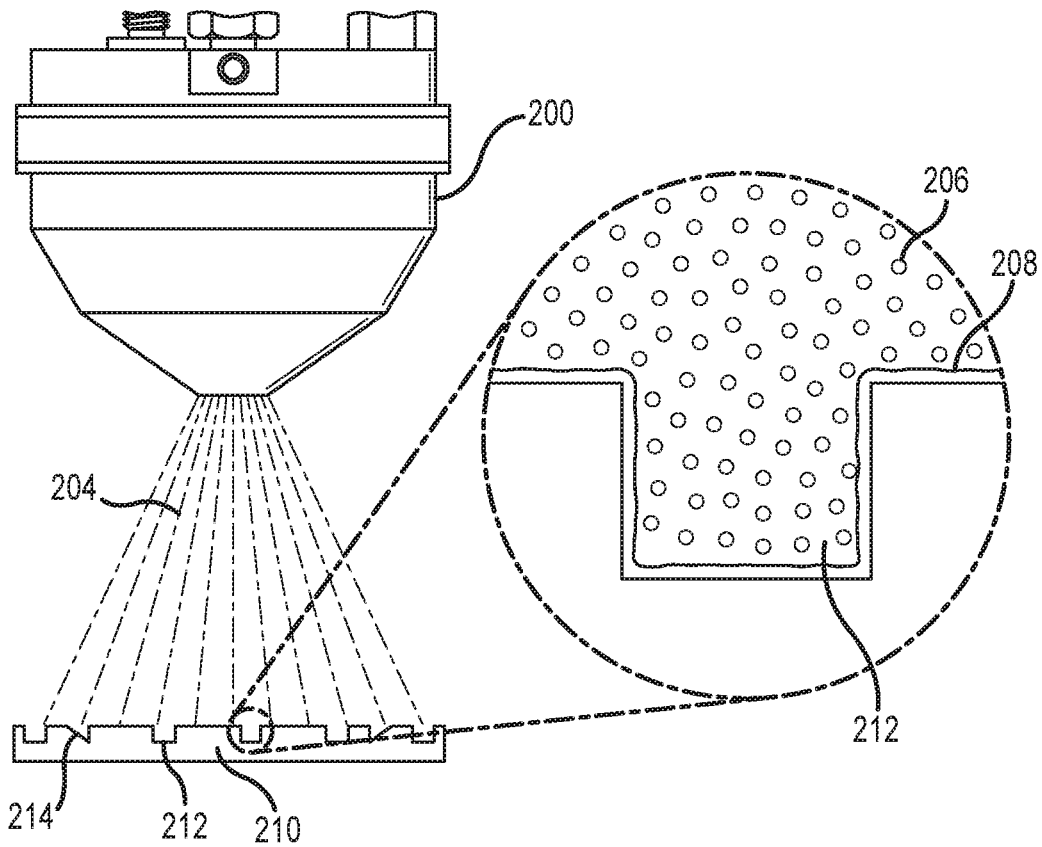
FIG. 2 shows a prior art ultrasonic nozzle system for spray coating a photoresist liquid on a substrate in the semiconductor industry.

FIG. 2 shows a state of the art ultrasonic nozzle system during the process of spraying a photoresist liquid on a substrate having trenches. There is shown an ultrasonic nozzle device 200, such as an ultrasonic nozzle device supplied by Sono-Tek Corporation. In operation, the ultrasonic nozzle device 200 produces a photoresist spray stream 204 and deposits the photoresist upon a substrate 210, which has a topography that includes trenches 212 and grooves 214. An exploded view of one trench 212 shows the individual atomized droplets 206 within the photoresist spray stream 204 collecting on the substrate 210 as the coating layer 208. The thickness of the coating layer 208 is substantially uniform on all surfaces of the trench 212 which is a significant improvement over spin coating techniques.

There are several differences between using the above spray coating technology in the semi-conductor industry and using it to manufacture acoustic-transducer membranes comprising an elastomer, as well as several obstacles that need to be addressed to efficiently produce a durable membrane of high quality and with improved properties and features.

Two such differences for manufacturing a membrane according to the present invention are that a liquid elastomer solution will be used for the spray coating instead of a photoresist, and that the elastomer will be removed from the mold after curing. For semi-conductor applications, the photoresist is used, for example, in the process of fabricating an integrated circuit and is intended to remain on the substrate.

The thickness of the liquid elastomer spray coated on the mold is also significantly different from the typical thickness of a photoresist layer spray coated on a substrate. For example, in typical semiconductor applications, the photoresist coating layer has a thickness less than 20 µm. A typical membrane comprised of an elastomer made by injection molding has a thickness of about 120 µm. While it is desirable to manufacture a membrane comprised of an elastomer having a thickness of less than 120 µm, it is not believed that a thickness of 20 µm is practical for an elastomer membrane.

A method of depositing siloxane-based elastomers such as polydimethylsiloxane (PDMS) onto microfabricated surfaces by spray coating was recently described. Choonee, K., R. R. A. Syms, M. M. Ahmad, and H. Zou. "Post Processing of Microstructures by PDMS Spray Deposition." *Sensors and Actuators A: Physical* 155.2 (2009): 253-62. Similar to the methods of spray coating a photoresist, however, the investigation of spray coating PDMS was only concerned with creating a thin layer, less than 10 µm, onto another structure. Creating an independent structural element, such as an acoustic transducer membrane, by spray coating an elastomer is not disclosed therein.

The larger thickness requirement of membranes over semiconductor applications presents a challenge for spray-coating. For best results, the spray coating liquid should have a kinematic viscosity of less than 20 cSt for most spray coating systems. Since liquid silicone used in injunction molding of membranes has a significantly high viscosity, a solvent is added to create an elastomer solution for spray coating. It is important that the solvent evaporate quickly, otherwise the cure time for the membrane will be unacceptably long. However, in semi-conductor applications using photoresists, excessively rapid evaporation of a solvent has been shown to cause "orange peel" on the substrate.

Two methods to address the challenge of spraying a low viscosity elastomer solution on a mold were discovered. In a first method, a mold having the desired membrane geometry is heated to an appropriate temperature. The liquid elastomer solution is then sprayed on the mold, where the heat causes the film to solidify almost immediately after deposition.

The second method involves spraying multiple thin layers on the mold. The liquid elastomer is mixed with a solvent that is fast evaporating. The elastomer solution is sprayed on the mold in a thin layer, which then solidified through evaporation of the solvent. More thin layers are sprayed on and allowed to cure before the next layer is deposited, until the desired membrane thickness is achieved.

Either of the two methods above can be employed in the process individually or together.

The process of manufacturing membrane 22 comprises of multiple spray-coated layers of silicone will now be described. While the method to be described produces a membrane made of silicone, it should be apparent that other thermoplastic elastomers may be used. Such suitable elastomers include those listed in publication U.S. 2012/0093353 A1.

Figure 3:
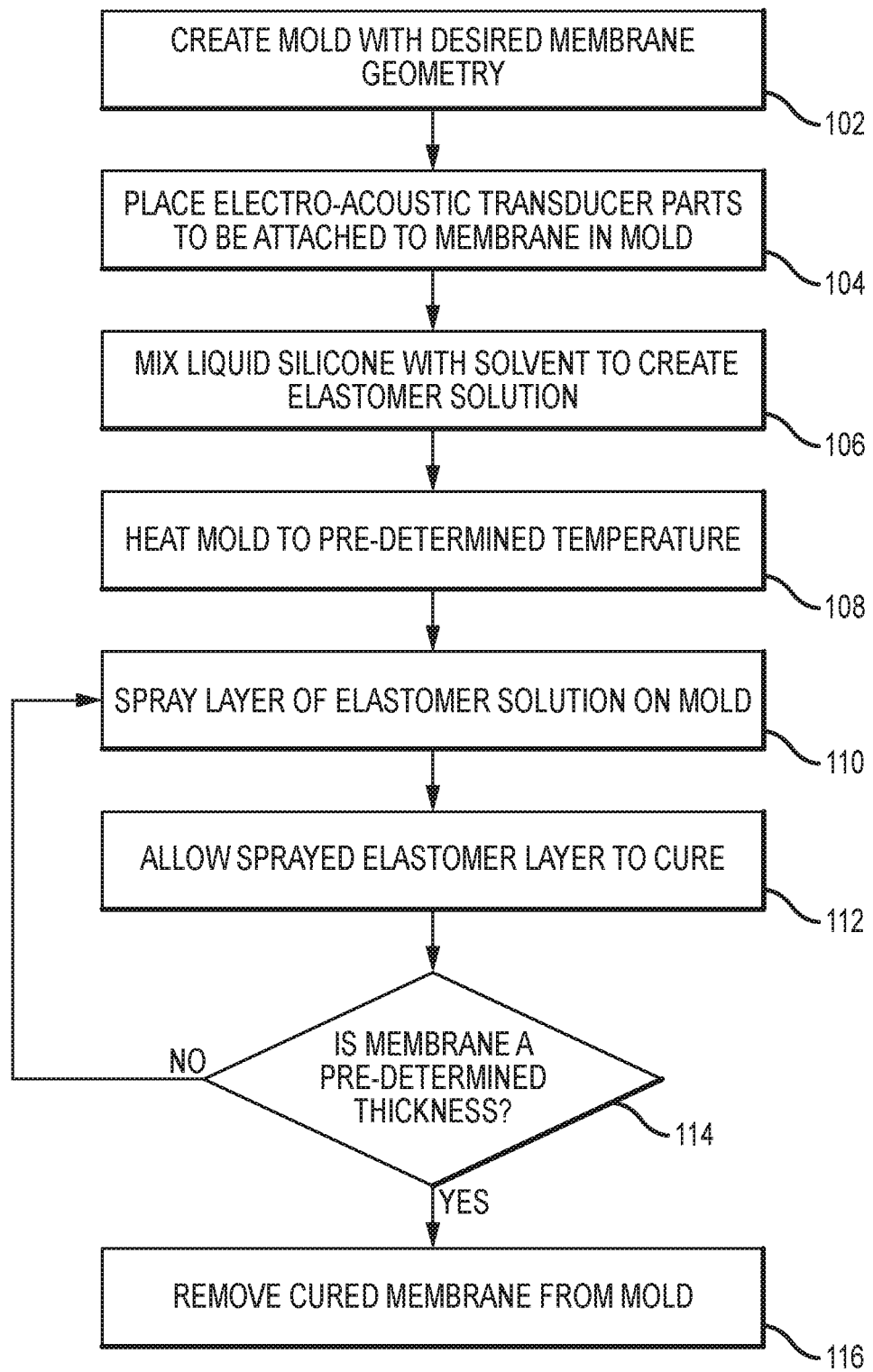
FIG. 3 is a block diagram showing the steps of a method of manufacturing a membrane according to one aspect of the present invention.
Figure 4:
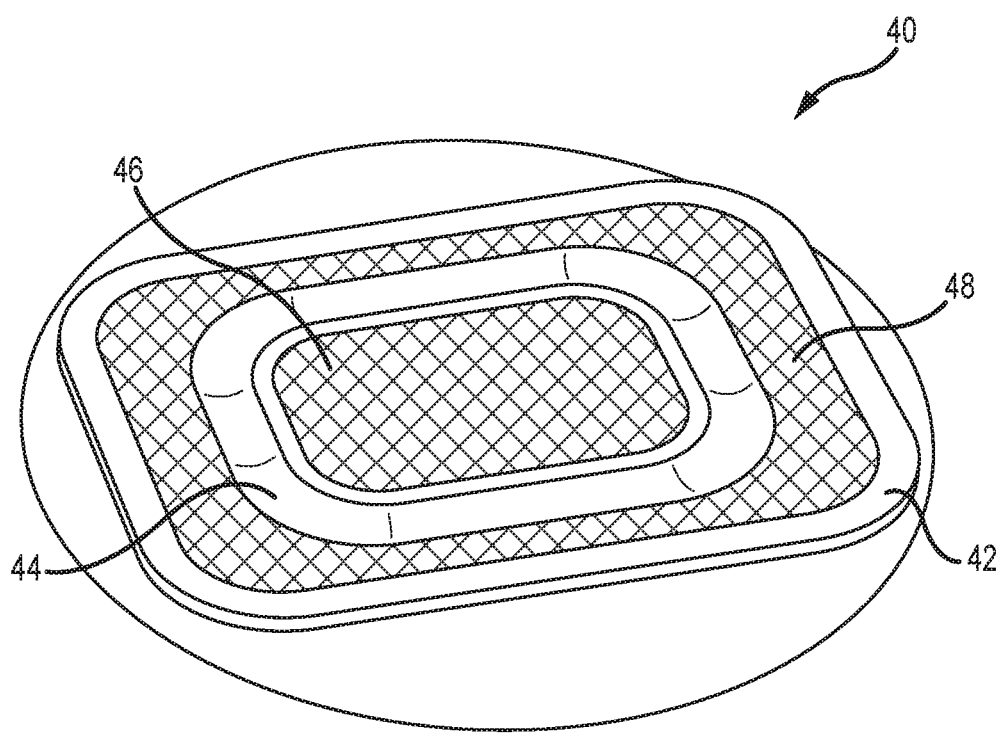
FIG. 4 is a prospective view of a brass mold for manufacturing an acoustic transducer membrane according to one aspect of the present invention.

FIG. 3 shows a block diagram of the process of manufacturing a spray-coated silicone membrane, comprising the steps 102-116. Step 102 comprises the creation of a mold having the desired membrane geometry. FIG. 4 shows such a mold 40. In this embodiment, mold 40 is made of brass, but is not so limited. Mold 40 contains a berm 42 that defines the edges of the membrane 22 and contains the liquid elastomer solution during the spraying process. In this embodiment, the mold 40 comprises a channel 44 corresponding to the torus 25 of the membrane 22. The channel 44 surrounds an inner flat area 46 and is surrounded by an outer flat area 48. Where a convex torus is desired on membrane 22, channel 44 in mold 40 could instead be a convex ridge surrounding the inner flat area 46.

Figure 5A:
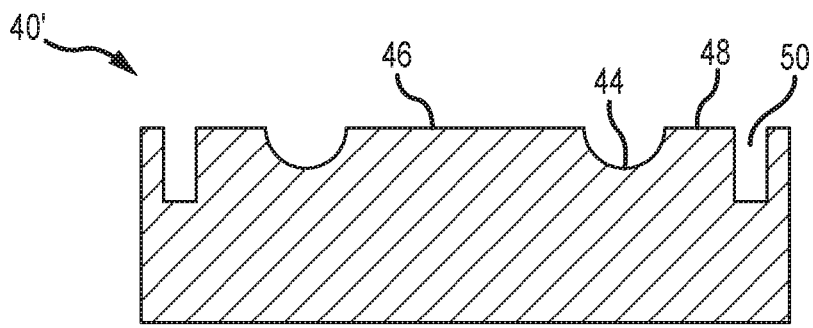
FIG. 5A is a side-view diagram of the mold of FIG. 4.
Figure 5B:
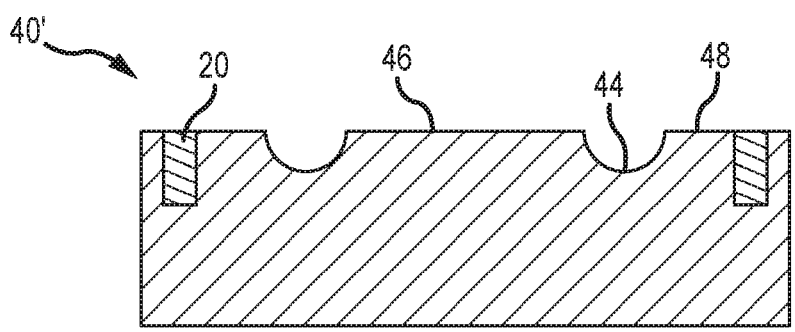
FIG. 5B is a diagram of the mold of FIG. 5A, with the frame located in a recess in the mold.

FIGS. 5A-5D show a side view schematic of a mold 40' at various steps in the process of FIG. 3. In this embodiment, the mold 40' differs from the mold 40 in that it also includes a recess 50 configured to hold the frame 20. In step 104, if the mold 40 includes a recess 50 or another recess configured to hold any other part of the electro-acoustic transducer, then such part is placed into the recess 50. As shown in FIG. 5B, the frame 20 is placed into the recess 50 in mold 40'.

In another aspect of the invention, a masking layer may be applied to one or more areas of mold 40 and/or the frame 20 (or other transducer part) prior to the following steps, preventing those areas from being covered with the liquid elastomer solution during the spray-coating step.

In step 106, the liquid silicone is mixed with the appropriate solvent to create a liquid elastomer solution. In step 108, the mold 40 is heated to a pre-determined temperature. A first layer of the liquid elastomer solution is sprayed on the mold 40 in step 110. After the layer is allowed to cure in step 112, the thickness of the membrane 22 is checked in step 114 to determine whether the pre-determined membrane thickness has been achieved. If not, the process goes back to step 110 and another layer is applied. If the pre-determined thickness has been reached, then the cured membrane is removed from the mold in step 116.

Figure 5C:
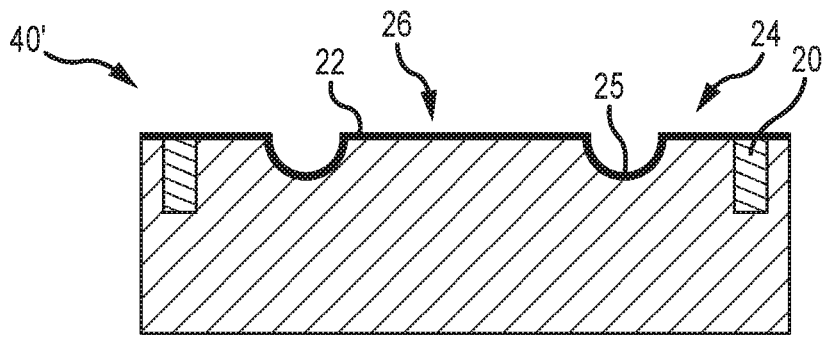
FIG. 5C is a diagram of the mold of FIG. 5B shown after one or more layers of liquid elastomer has been deposited on the mold.
Figure 5D:
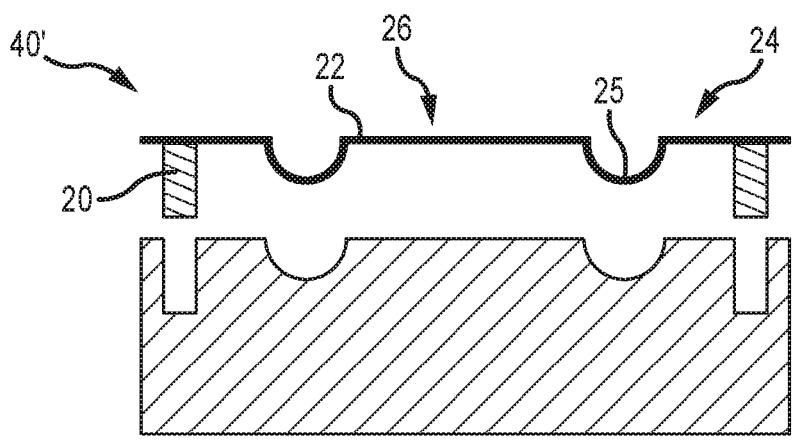
FIG. 5D is a diagram of the mold of FIG. 5C shown with the cured membrane attached to the frame and lifted off the mold.

FIG. 5C shows the membrane 22 after the pre-determined thickness has been obtained but still on mold 40'. FIG. 5D shows the membrane 22 removed from the mold 40' and with the frame 20 attached thereto.

Figure 6:
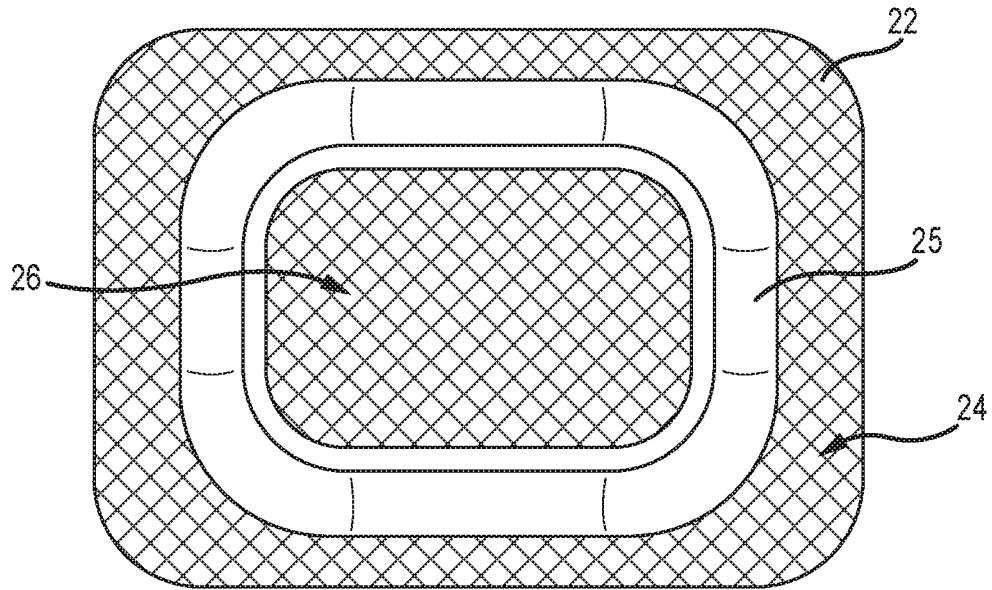
FIG. 6 is a top view of a membrane according to one aspect of the invention.
Figure 7:
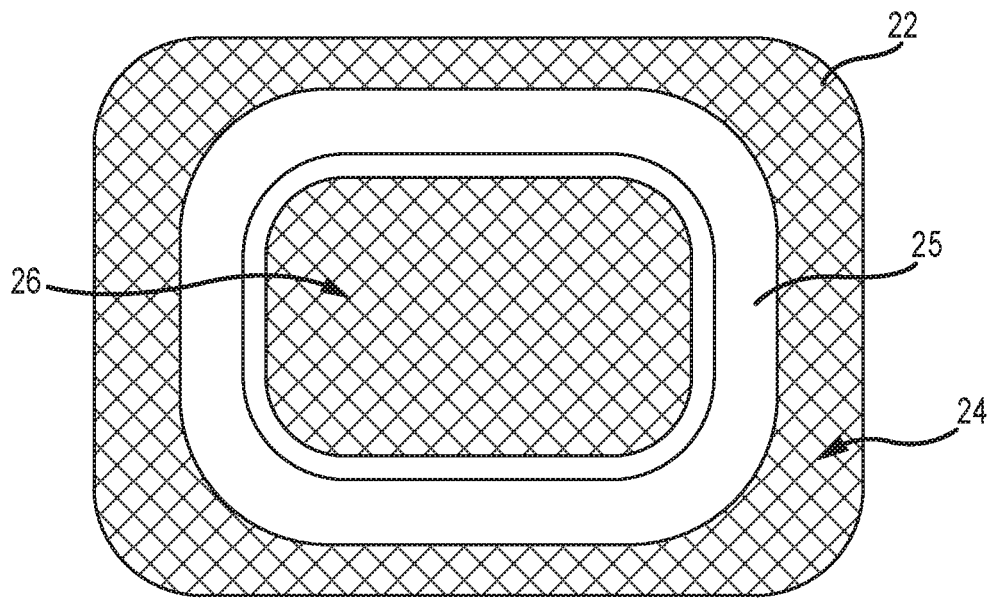
FIG. 7 is a bottom view of the membrane of FIG. 6.

FIGS. 6 and 7 show top and bottom views, respectively, of membrane 22 produced in the process using mold 40. In this embodiment, no other parts of the electro-acoustic transducer are attached to the membrane 22.

As mentioned above, a mold used in the method of making a membrane via spray coating a liquid elastomer may be configured with a recess to accept, in an embodiment, a stiffening plate such that the membrane will be adhered to the stiffening plate without the use of adhesives. Alternatively, a stiffening plate may be inserted onto the mold in between layers of elastomer solution sprayed on the mold. For example, in the process of manufacturing a spray-coated silicone membrane shown in FIG. 3, after a sprayed elastomer layer is allowed to cure in step 112, a stiffing plate may be placed on the membrane before another layer of elastomer solution is sprayed on the mold in step 110.

Figure 8:
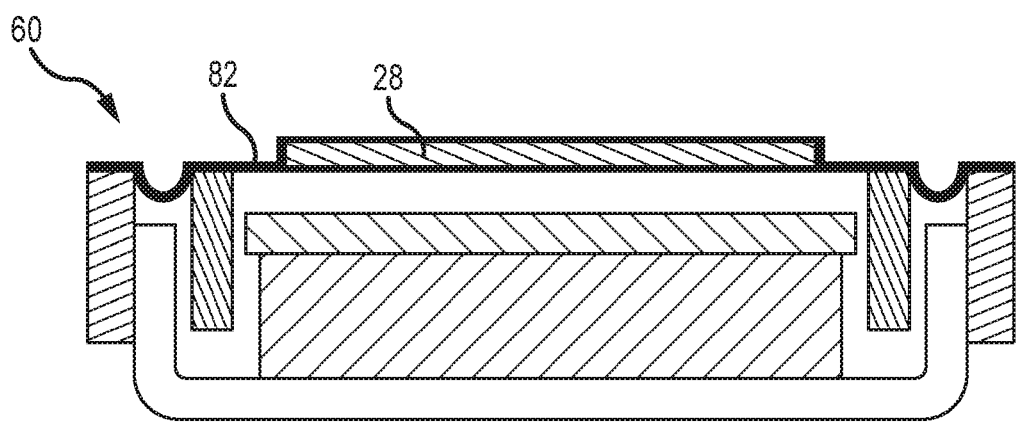
FIG. 8 is a cross-sectional view of a micro speaker of FIG. 1 having a membrane according to another aspect of the invention.

FIG. 8 shows a cross-sectional view of micro speaker 60 with a membrane 82 having a stiffening plate 28 within the elastomer structure of the finished membrane 82. In this embodiment, the stiffening plate 28 is surrounded on all sides by the elastomer material once cured. The above described process will provide for a new and unique membrane that combines the advantages obtainable with electroacoustic membranes comprised of an elastomer with some of the advantages obtainable with membranes made of thermoplastic foil formed by deep drawing or stamping, as well new benefits and advantages not obtained through either process.

In particular, the manufacturing process is improved over both injection molding in several respects, allowing for faster development cycle time, easier sample builds, easier tool design and manufacturing process. As opposed to injection molding, only one side of a mold is required, making it easier and faster to create a mold having a desired membrane geometry and allowing for greater flexibility in the finished product. Further, without the need to align the two parts of a mold during the process, the manufacturing process becomes simplified and quicker, with a greater degree of repeatability. It is also possible to create a membrane having multiple layers, allowing for the mechanical properties of a membrane to be adjusted based on the different materials being used.

Spray-coating also provides for savings in material and costs over deep drawing or stamping of thermoplastic foils because there is no extrusion process or cutting required in spray-coating processes. Further, the spacing between samples is reduced for spray-coating, providing for further savings in materials.

A significant advantage obtainable with spray-coating and not available in either deep drawing or stamping of thermoplastic foils or with injection molding of elastomer-based membranes is the ability to incorporate additional parts of an electro-acoustic transducer into the membrane during the manufacturing process without the use of any additional adhesive. The mold used in the spray-coating process can be configured to receive a part of an electro-acoustic transducer that is typically affixed to the membrane in conventional layouts. This is particularly useful for the frame and voice coil in a conventional speaker, both of which are typically affixed to the membrane with an adhesive. The process can produce a membrane affixed to the frame and/or voice coil through the curing of a layer of elastomer in contact with the part.

It is also possible to embed a wire loop into the membrane, with connections to the voice coil, providing a greater stability and durability to the wire connections. Further, the ability to create a membrane from multiple layers of different materials provides the option of creating an electrical conductive layer amongst the layers of elastomer material. Such an electrical conductive layer could replace the need for a wire loop as it could provide the necessary connections to the voice coil.

Another advantage that the inventive process will allow is for the ability to create multiple layers of different material for a silicone based membrane, something that is not currently possible with injection molding processes. It is often desirable to create a membrane for an acoustic device using multiple layers of different materials in order to adjust the stability of the membrane or the damping properties of the membrane. May also be possible to create an electrical conductive layer within the membrane structure which could replace the wire loop for coil lead wires.

In closing, it should be noted that the invention is not limited to the above mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention. The scope of the present invention is defined by the appended claims, including known equivalents and unforeseeable equivalents at the time of filing of this application.

What is claimed is:

1. A membrane for an electroacoustic transducer, the membrane comprising one or more spray-coated layers of an elastomer,
   wherein the membrane is affixed to one or more components of an electroacoustic transducer through curing of the one or more spray coated layers of an elastomer,
   wherein the membrane comprises more than one spray-coated layer of an elastomer, the layers being of different elastomer materials having different mechanical properties.

2. The membrane according to claim 1, further comprising one or more spray-coated layers of a non-elastomer thermoplastic.

3. The membrane according to claim 1, wherein the one or more components of an electroacoustic transducer is one of a voice coil, a frame, a stiffening plate and a wire loop.

4. The membrane according to claim 1, wherein the membrane has a thickness of less than 100 μm.

5. The membrane according to claim 1, wherein the membrane has a thickness between about 150 μm and about 200 μm.

6. The membrane according to claim 1, further comprising one or more spray-coated layers of a conductive material, in order to create an electrical conductive layer.

7. A membrane for an electroacoustic transducer, the membrane comprising one or more spray-coated layers of an elastomer, the membrane being manufactured by a method comprising the steps of:
   placing a component of the electroacoustic transducer into a recess on a mold having a desired membrane geometry, the recess being configured to accept the component of the electroacoustic transducer;
   spray coating one or more layers of a liquid elastomer solution on the mold;
   allowing the liquid elastomer to cure; and
   removing the cured elastomer in the shape of the membrane off the mold,
   wherein the component of the electroacoustic transducer is adhered to the cured elastomer after the removal step without the use of an adhesive.

8. A membrane for an electroacoustic transducer, the membrane comprising two or more spray-coated layers of an elastomer, the membrane being manufactured by a method comprising the steps of:
   placing a component of the electroacoustic transducer into a recess on a mold having a desired membrane geometry, the recess being configured to accept the component of the electroacoustic transducer;
   spray coating one layer of a liquid elastomer solution on the mold;
   allowing the liquid elastomer to cure;
   repeating the spray coating and curing steps one or more times until the thickness of the membrane is a desired thickness; and
   removing the cured elastomer in the shape of the membrane off the mold,
   wherein the component of the electroacoustic transducer is adhered to the cured elastomer after the removal step without the use of an adhesive.

9. The membrane according to claim 7, wherein the component of the electroacoustic transducer is one of a voice coil, a frame, a stiffening plate and a wire loop.

10. The membrane according to claim 8, wherein the component of the electroacoustic transducer is one of a voice coil, a frame, a stiffening plate and a wire loop.

11. The membrane according to claim 8, wherein the two or more spray-coated layers are of different elastomer materials having different mechanical properties.

* * * * *